(12) United States Patent
Chang et al.

(10) Patent No.: US 10,394,629 B2
(45) Date of Patent: Aug. 27, 2019

(54) MANAGING A PLUG-IN APPLICATION RECIPE VIA AN INTERFACE

(71) Applicant: Oracle International Corporation, Redwood Shores, CA (US)

(72) Inventors: Tuck Chang, Santa Clara, CA (US); Tim Diekmann, San Jose, CA (US); Najeeb Andrabi, Cupertino, CA (US); Anna Igorevna Bokhan-Dilawari, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/994,346

(22) Filed: May 31, 2018

(65) Prior Publication Data
US 2019/0004879 A1    Jan. 3, 2019

Related U.S. Application Data (60) Provisional application No. 62/527,927, filed on Jun. 30, 2017.

(51) Int. Cl.
*G06F 9/54* (2006.01)
(52) U.S. Cl.
CPC .................... *G06F 9/543* (2013.01)
(58) Field of Classification Search
CPC ....................................... G06F 9/541
USPC ........................................ 719/328
See application file for complete search history.

(56) References Cited

U.S. PATENT DOCUMENTS

| | | | | |
|---|---|---|---|---|
| 8,589,955 | B2* | 11/2013 | Roundtree | G06F 8/61 717/100 |
| 2011/0154290 | A1* | 6/2011 | Kelly | G06F 9/44505 717/110 |

* cited by examiner

*Primary Examiner* — Andy Ho
(74) *Attorney, Agent, or Firm* — Invoke

(57) ABSTRACT

Techniques for managing a plug-in application recipe ("PIAR") are disclosed. A mapping between (a) a user-selected field, selected via a PIAR creation interface, and (b) a third-party application field, exposed by an application programming interface ("API") of a third-party application, is stored. The third-party application field is associated with a trigger or action of a PIAR. Managing the PIAR in an active state involves periodically receiving and checking data from the third-party application field against a PIAR condition. During or after managing the PIAR in the active state, information is stored to update the mapping to a different mapping. The different mapping maps the user-selected field to a different third-party application field. Without modifying the PIAR, managing the PIAR in the active state then involves periodically receiving and checking data from the different third-party application field against the PIAR condition.

20 Claims, 5 Drawing Sheets

MANAGING A PLUG-IN APPLICATION RECIPE VIA AN INTERFACE

BENEFIT CLAIMS; RELATED APPLICATIONS; INCORPORATION BY REFERENCE

This application claims the benefit of U.S. Provisional Patent Application 62/527,927, filed Jun. 30, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to plug-in application recipes. Specifically, the present disclosure relates to managing a plug-in application recipe.

BACKGROUND

A plug-in-application recipe ("PIAR") is a set that includes a triggering event (referred to herein as a "trigger" or "trigger condition") and an action, arranged logically as an if-then formulation. The "if" portion of the formulation corresponds to a PIAR trigger condition. The "then" portion of the formulation is conditioned on the "if" portion being satisfied, and corresponds to a triggerable action. A plug-in application may supply the action. A plug-in application that supplies an action may be the same as, or different than, a plug-in application that supplies a trigger.

A PIAR management system presents an interface that allows a user to define PIARs. A PIAR definition indicates one or more actions to be executed by the PIAR management system. A PIAR definition further indicates a trigger of a plug-in application. When a PIAR management system detects that a trigger condition is satisfied, the PIAR executes the action(s) corresponding to the detected trigger.

The term "plug-in application" refers to the fact that an application's trigger(s) and/or action(s) logically 'plug in' to the PIAR and thus become part of the logic of a PIAR. For example, PIAR management systems may be organized such that several independent services are plugged into the PIAR management application. A plugged-in service may provide monitoring service(s) specific to a particular application to support trigger(s) for the particular application. Alternatively or in addition, a plugged-in service may provide action service(s) specific to the particular application to support action(s) for the particular application. Services may communicate through application programming interfaces (APIs). In the present disclosure, a plug-in application may also be referred to as a "third-party application" (for plug-in applications supplied by third parties) or simply an "application," which is understood to be a plug-in application by virtue of the context that it is supplying a triggering condition and/or executing an associated action of a PIAR.

An API is a set of tools and protocols that allows services to function and interact with one another. An API may facilitate communication between a server and a client or between different applications and/or services, such as a desktop application and a web service. An API may include routines and protocols to specify how components interact. An API may expose information, allowing data to be retrieved from an application. For example, an email application's API may expose contact information. Another application may use the API to retrieve the exposed contact information. For example an API may support a HTTP GET operation. Many different types of APIs exist that may or may not rely on HTTP-related protocols.

Representational State Transfer (REST) is a resource-based API architecture. A REST API associates an endpoint with a particular resource, such as a product or user. REST responses can be cached, which improves performance and scalability. Also improving scalability, REST API connections may occur through several communication layers. Use of communication layers may prevent a client from distinguishing whether the client is directly connected to the application server or to an intermediary agent that relays the information. REST operations are inherited from HTTP, making REST operations relatively easy for both developers and web-browsers to consume. Thus, REST has a simplicity that makes REST APIs very popular. One or more embodiments described herein may include one or more plug-in applications exposing REST APIs.

A PIAR management application may be used for many purposes. For example, a PIAR management application may be used to automate repetitive tasks. As an example, a PIAR may involve, responsive to detecting that a user's car is in the user's driveway (trigger), opening the user's garage door (action). In this example, an exposed API for Android phones provides Global Positioning System (GPS) coordinates of a smart phone that might be in a user's car. When the phone is in the user's car and the phone's GPS coordinates are proximate to the garage door, the triggering event occurs. A smart switch may be wired in-line with a physical garage door opener. An exposed API for the smart switch, when toggled, may cause the smart switch to open the garage door. As another example, a PIAR may involve, responsive to determining that a user's walked steps have not reached a particular goal by 5 p.m. (trigger), transmitting a notification to the user (action). In this example, the GPS coordinates of an iPhone, via an exposed API, are determined and used to calculate the user's steps taken. At 5 p.m., if the calculated number of steps is less than the goal, the triggering event occurs. A service on the iPhone generates a push notification as the corresponding action. As another example, a PIAR may involve, responsive to detecting a new sales contact in an address book or email (trigger), creating a new spreadsheet entry to store information about the sales contact (action). In this example, an exposed API in Gmail is used to identify the keyword "sales" in any email. The exposed API is further used to retrieve the sender's email address when the keyword "sales" is found in an email. The sender's email address is compared with the PIAR user's Gmail address book. If the sender's email address is not in the PIAR user's Gmail address book, then the triggering event occurs. A new spreadsheet entry is created in Excel, by transmitting sender data copied from metadata of the triggering email and pasting the data into a prescribed Excel spreadsheet cell. In general, a PIAR may involve a series of one or more actions, executed responsive to one or more triggers, that result in functionality not natively supported by any of the plug-in applications in isolation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. PIAR Management System

Figure 1:
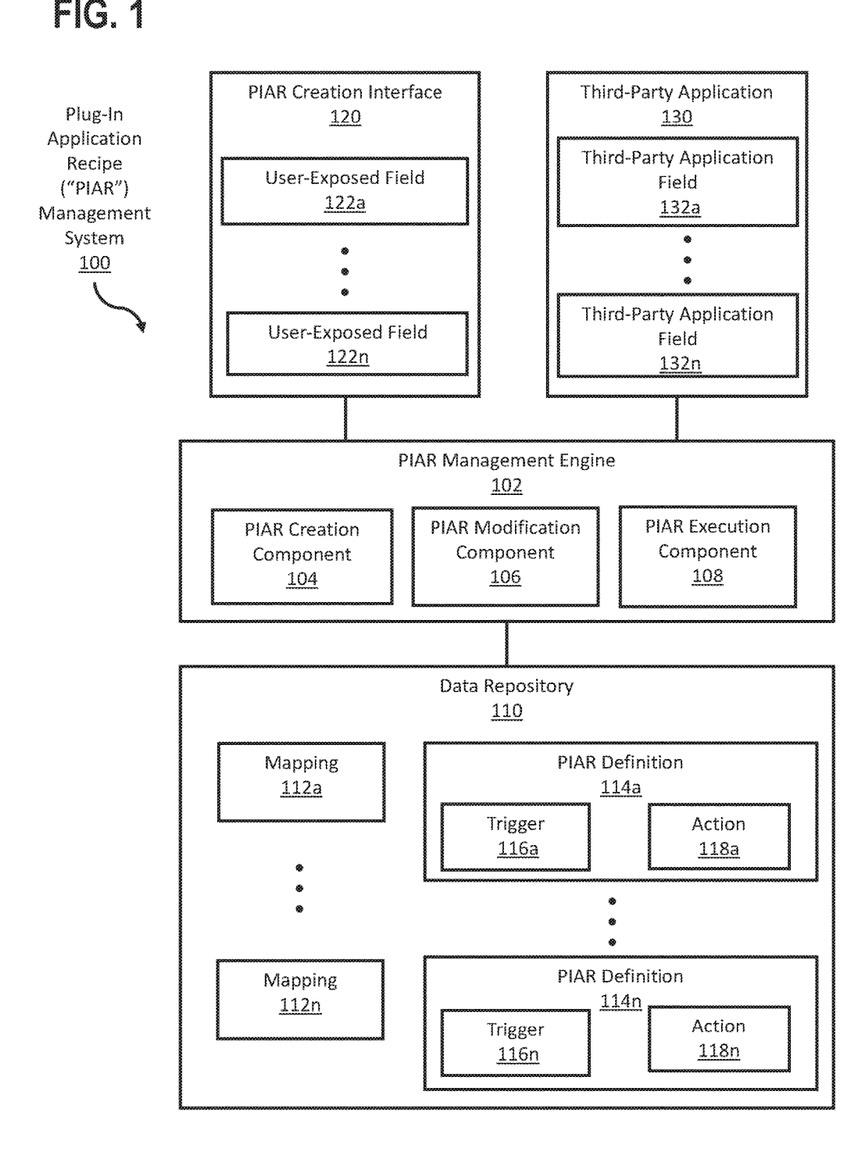
FIG. 1 illustrates a PIAR management system in accordance with one or more embodiments.

FIG. 1 illustrates a block diagram example of a PIAR management system 100. The PIAR management system 100 manages mappings between user-exposed fields, selectable via a PIAR creation interface 120, and another set of fields exposed by an Application Programming interface (API) of a third-party application ("third-party application field") (e.g., third-party application fields 132a-132n of third-party application 130). A user-exposed field is initially mapped to an initial third-party application field, via an initial mapping. At some time, the third-party application is to be modified, for example via an API change in the third-party application. The PIAR management system 100 stores an updated mapping between the user-exposed field and a new or modified third-party application field, to reflect the change to the third-party application. The initial mapping may remain active for a time, while the updated mapping is not yet active. At or around the time that the third-party application is modified, the PIAR management system 100 may activate the updated mapping, and may deactivate the initial mapping. Alternatively or additionally, the PIAR management system 100 may activate the updated mapping at a time subsequent to the modification of the third-party application, to repair a PIAR that ceased to function properly upon the modification of the third-party application. Alternatively or additionally, if the change in the third-party application is backward-compatible (as discussed in further detail below), the initial mapping may remain active.

The example of a PIAR management system 100, as illustrated in FIG. 1, includes a PIAR management engine 102, data repository 110, PIAR creation interface 120, and third-party application 130. In one or more embodiments, the PIAR management system 100 may include more or fewer components than the components illustrated in FIG. 1. A PIAR management system 100 may include different types of components than the components illustrated in FIG. 1. Two or more components within PIAR management system 100 may be communicatively coupled via a local area network, a wide area network, the internet, an intranet, a cellular network, and/or combinations thereof.

A single component within PIAR management system 100 may correspond to a single digital device or be implemented across multiple digital devices. Multiple components within PIAR management system 100 may be implemented on the same digital device. For example, the PIAR management engine 102 and the PIAR creation interface 120 may be implemented on the same device. The term "digital device" generally refers to any hardware device that includes a processor. Examples of digital devices include a server, a computer, a tablet, a laptop, a desktop, a netbook, a cellular phone, a television, a monitor, a content receiver, a set-top box, a streaming stick, a video gaming console, a mobile handset, a smartphone, a personal digital assistant "PDA", a Bluetooth enabled device, a wireless receiver and/or transmitter, an access point, a base station, a communication management device, a router, a switch, and/or a controller.

In an embodiment, the data repository 110 is any type of storage unit and/or device (e.g., a file system, database, collection of tables, or any other storage mechanism) for storing data. Further, the data repository 110 may include multiple different storage units and/or devices. The multiple different storage units and/or devices may or may not be of the same type or located at the same physical site.

In an embodiment, the data repository stores one or more PIAR definitions 114a-114n. A PIAR is a sequence of steps and mappings, which may operate between various services and/or applications. All PIARs require a trigger and an action. Many different types of triggers may be used. For example, a trigger may be detected as a discreet event associated with a plug-in application (which may be a service; the term "application" should not be construed as limited to an particular type of application or service), such as the creation of a record, the deletion of a record, receipt or transmission of a message or notification, satisfaction of a predefined threshold condition, or any other type of discreet event whose detection may be supported by a plug-in application's API. Alternatively or in addition, a trigger condition may be detected as the delta between data received in response to two separate outbound calls to a third-party service provider. The fact that there is a difference in the returned data may be considered the trigger event that initiates execution of the sequence of action steps, which may be executed once per detected delta. The trigger condition and action may be performed multiple times while the PIAR is active. The PIAR is active when it is executing. A PIAR generally remains active until the PIAR is deactivated. For example, a PIAR may continue checking for a triggering condition until the PIAR is deactivated.

In an embodiment, a PIAR may involve multiple actions performed in response to detecting a trigger. Two or more actions (which may be separate instances of the same action) may be performed concurrently or in a fixed sequence. A combination of concurrent and/or sequential actions may be used. The output of one action may be used as input to another action. For example, suppose a PIAR is created with a trigger defined as receiving an email from a prospective customer (e.g. receiving an email at an email address only given to prospective customers). In this example, a series of actions performed in response to receiving the email may include (1) determining whether the prospect is already listed in a customer relationship management (CRM) application, and (2) if the prospect is not already listed in the CRM application, adding the prospect to the CRM application and sending a notification email to a sales manager. Adding the prospect to the CRM application and sending the notification email to the sales manager may be performed concurrently or in a particular order. For example, the notification email may be sent only after receiving confirmation from the CRM application that the prospect was added successfully. Many different combinations of concurrent and/or sequential actions may be used in a PIAR.

In an embodiment, the PIAR management engine 102 supports PIAR definitions that involve a series of actions. For example, in response to a particular trigger, a PIAR may perform a particular action, "Action A." The output of Action A may then be used as input to another action, "Action B." The output of Action B may then be used as input to another action, "Action C," and so on. Functions and/or data exposed by Action A may be available as input to Action B and/or as input to subsequent actions, such as Action C. Functions and/or data exposed by a later action, such as Action C, may not be available as input to an earlier action, such as Action B or action A. For example, if Action B completes before Action C completes, then it is not possible for Action B to receive input from Action C.

In an embodiment, one or more actions in a PIAR may be performed conditionally, based on evaluation of the initiating trigger or, if the action is part of a series of actions, evaluation of output from a preceding action. For example, conditional logic (e.g., if, then, else, etc.) may be used to determine, in response to detecting a trigger, the particular sequence of actions, if any, to perform. The PAIR management system 100 may include an interface allowing a user to define such conditional logic for a particular PIAR. Further, evaluating a trigger and/or output of a preceding action may involve looping through multiple variable values. For example, a trigger or action may supply an array of values, and evaluating the trigger or action may involve iteratively evaluating (or "looping through") each of those values. Looping through such values may itself be subject to conditional logic. Many different combinations of conditional logic and/or looping through variables may be used to determine the particular action(s), if any, performed when a trigger is detected.

A PIAR management system 100 may implement multiple services. For example, a PIAR management system 100 may implement a service to monitor a plug-in application for a triggering condition. The PIAR management system 100 may retrieve information via an exposed API of the plug-in application. The PIAR management system 100 may store the retrieved information and/or transmit the retrieved information to an API of a different plug-in application. A PIAR management system 100 may include functionality to communicate with different APIs of different applications using different protocols. A PIAR management system 100 may include functionality to execute multiple steps in an action, without the need for user interaction or exposing the steps to a user. The system may manage multiple instances of a particular PIAR at a given time.

A PIAR definition (e.g., 114a-114n) defines a PIAR. A PIAR may be defined, at least in part, by user input. A PIAR definition may include one or more triggers and one or more actions to be executed upon detecting the trigger(s). For example, the system may receive, via a user interface, a selection of a triggering application and a selection of a triggering event within that application. The system may further receive a selection of an application (which may be the same application or a different application) to execute a particular selected action responsive to the triggering event(s).

In an embodiment, a trigger (e.g., 116a-116n) is an event that must be satisfied to initiate a PIAR. The system may continuously monitor a triggering plug-in application until the triggering event occurs. An event may be exposed by an API of the application. Upon execution of the event, the PIAR management system 100 may retrieve information indicating that the event has occurred. The PIAR management system 100 may recognize the event as a triggering event for a particular PIAR, and initiate an action in response to detection of the triggering event.

In an embodiment, an action (e.g., 118a-118n) is an operation to be executed in a PIAR. An action may be associated with multiple fields and parameters. Exemplary actions include sending an email, saving a file, preheating an oven, updating a database, or any other type of action that may be executed or initiated by a computer system, without user intervention, in response to detecting a triggering condition. A third-party application that is linked or plugged-in to a PIAR management engine 102 may execute an action. Alternatively or additionally, the PIAR management engine 102 itself may execute an action.

In an embodiment, the PIAR management system 100 stores one or more mappings (e.g., 112a-112n) in the data repository 110. A mapping may map a third-party application field to a user-modifiable field. A mapping may connect an action or trigger, selected in the PIAR creation interface 120, to an operation of the third-party application. Multiple user-exposed fields of multiple users may be mapped to a single third-party application field. For example, an application may be used by many different users in a multitenant cloud PAIR management system. A mapping may include functionality to send a request to a third-party application. A mapping may include functionality to transmit and/or store information retrieved from the third-party application. In general, a mapping describes a correspondence between a field of a triggering application in a PAIR and a field of another application that executes an action in the PIAR, where a value of the field of the triggering application is supplied as input to the field of the application executing the action. The mapping may include one or more transformations to be applied to the value of the field before it is supplied to the application executing the action. A mapping may be updated to map a particular user-exposed field to a new or modified third-party application field. A mapping between a user-exposed field and a third-party application field may or may not be exposed to a user via the PIAR creation interface 120. Some mappings may be user-exposed while other mappings may not be user-exposed.

In general, the term "user-exposed" refers to the fact that the field is available for selection, by a user, in the PIAR creation interface 120. In other words, the field is "exposed" to a user via the interface 120. The format of a user-exposed field may be identical to the format of a field exposed by a triggering application. Alternatively or additionally, the format of a user-exposed field may be different than the format of a field exposed by a triggering application. In one embodiment, a mapping may allow for a user-exposed field to remain unchanged (i.e., the user experience in the PIAR creation interface 120, relative to the user-exposed field, may not change) even though the format of the field exposed by the triggering application has changed. Said another way, a data structure used to implement the mapping (e.g. a JavaScript Object Notation (JSON) data structure or another data structure used to implement a mapping for a PIAR) may change without changing the user experience. Thus, the mapping may help shield a user from underlying technical changes in a PIAR, providing for a smoother user experience with fewer service interruptions.

In an embodiment, a PIAR creation interface 120 is an interface for defining a PIAR. The PIAR creation interface 120 may be a Graphical User Interface (GUI). The PIAR creation interface 120 may include functionality to configure a value corresponding to a user-exposed field.

In an example, the PAIR creation interface 120 includes options to specify a name of a PIAR, a trigger which is a condition to be detected, a third-party application to be monitored for detection of the trigger, an action to be executed in response to detection of the trigger, and a third-party application to execute the action. The PIAR creation interface 120 may further include options to specify one or more transformations to be applied to the values of fields (e.g. values obtained from triggering applications) used as input to the application(s) executing the action(s) responsive to triggers. The action may be executed by the same third-party application that is monitored for the detection of a trigger. Alternatively, the action may be executed by a different third-party application than the third-party application that is monitored for detection of a trigger. The PIAR creation interface 120 may be modified responsive to receiving user input, such as by generating additional fields for configuring an action.

In an embodiment, a user-exposed field (e.g., 122a-122n) includes functionality to accept user input tied to a particular feature of a PIAR. The user-exposed field may be used, as part of a mapping, to cause actions to be performed across different applications and/or services. The user-exposed field may, for example, be a box for entering text, or a drop-down menu. The user-exposed field may allow a user to configure a value to be used in a PIAR. For example, a user-exposed field may display a series of possible triggers for a user to select for a given application.

In an embodiment, a PIAR management engine 102 includes software configured to manage a PIAR. The PIAR management engine 102 includes a PIAR creation component 104, a PIAR modification component 106, and a PIAR execution component 108.

In an embodiment, the PIAR creation component 104 includes hardware and/or software configured to create a PAIR. The PIAR creation component 104 may receive input defining triggers and actions from the data repository and/or the PIAR creation interface 120. The PIAR creation component 104 may generate instructions to be transmitted to a third-party application, such that the third-party application executes a particular operation.

In an embodiment, the PIAR modification component 106 includes hardware and/or software configured to modify a PIAR. The PIAR modification component may monitor a third-party application for changes to any relevant third-party application fields. For example, a plugged-in service may monitor an application for changes to several third-party application fields. The PIAR modification component 106 may periodically poll the third-party application for input requirements for a third-party application field that are exposed by an API of the third-party application. Responsive to detecting a new or modified third-party application field, the PIAR modification component 106 may adjust the corresponding mapping, PIAR, and/or user-exposed field. For example, an existing PIAR may map a date, in MMD-DYYYY format, to an application-exposed field that requires the date in that format. The PIAR management system 100 detects that the third-party application has modified the third-party application field to require the date in DDMMYYYY format. Responsive to detecting the modification, the PIAR modification component 106 stores a modified application-exposed mapping. The modified mapping maps the user-exposed field to the modified application-exposed field, while reformatting the date. The modified application-exposed mapping need not be exposed to a user or require user input.

In an embodiment, the PIAR execution component 108 includes hardware and/or software configured to execute a PIAR. The PIAR execution component 108 may direct the execution of one or more actions responsive to a detected trigger. The PIAR execution component 108 may direct or request the third-party application 130 to execute an action. For example, the PIAR execution component 108 may transmit an HTTP POST request to a third-party application's API, such that the third-party application saves contact information to an address book. Alternatively or additionally, the PIAR execution component 108 may itself execute an action. In other words, the PIAR management system 100 itself may execute an action responsive to a trigger, without invoking a third-party application 130.

The PIAR management system 100 further includes a third-party application 130 that is linked or plugged-in to the PIAR management engine 102. The third-party application 130 may be of any type and/or category. The PIAR management system 100 may be linked to multiple third-party applications.

In an embodiment, each of a set of linked (also referred to as "plugged in" or "plug-in") applications exposes an interface to the PIAR management engine 102. The interface may be exposed by each of the plug-in applications via a service that is separated from the respective plug-in application or is included as a component of each respective plug-in application. The PIAR management engine 102 may use the interface to monitor triggers corresponding to conditions that may satisfied by a plug-in application. The PIAR management engine 102 may use the interface to request a plug-in application to execute one or more actions. The plug-in applications may operate independently and without control by the PIAR management engine 102. The plug-in applications may operate independently of each other and/or of the PIAR management engine 102, for example, without having one application control another and/or without having the applications controlled by the PAIR management engine 102. The plug-in applications may be considered independent even if the applications expose limited interfaces for monitoring pre-defined triggers and/or for causing pre-defined actions, so long as the consumer of the interface does not retain any control over (a) how the monitoring is performed, as it is being performed, beyond the pre-defined fields that are initially provided, via the interface, to define what is to be monitored, or (b) how the actions are performed, as the actions are being performed, beyond the pre-defined fields that are initially provided, via the interface, to define what is to be performed.

In an embodiment, functionality of a plug-in application that is accessible to the PIAR management engine 102 is a subset of the plug-in application's full functionality. Specifically, a plug-in application may expose an API providing access to certain functions and/or data of the plug-in application, without providing access to other functions and/or data of the plug-in application. In other words, the functionality exposed to the PIAR management engine 102 may be a proper subset (a.k.a. strict subset) of the plug-in application's full functionality. For example, the API may be a restful state transfer (REST) API. Other types of APIs may be used. As an example, an email application may not expose email sending functionality to the PIAR management engine 102, but may expose information about emails that have been received, such as the date, time, sender, recipient, subject line, and content of the email. As another example, a calendar application may not expose functionality to cancel events, but may expose information about events that have already been scheduled (e.g., date, time, location, participants, etc.) and/or functionality to schedule new events. The set of functionality exposed to the PIAR management engine 102 may depend on one or more authorization policies. In an embodiment, the PIAR management engine 102 stores an authorization token that it uses to authenticate access to a plug-in application's API. As an example, the PIAR management engine 102 may prompt a user, via the PIAR creation interface 120, to input a username and password to access an email application's API. The PIAR management engine 102 may store the username and password in an encrypted token that it uses to request access to the exposed functions and/or data of the email application.

Linking the third-party application 130 to the PIAR management engine 102 may include monitoring of the third-party application 130 and reporting, to the PIAR management engine 102, the detection of triggers defined in relation to the third-party application 130. As an example, a trigger may include detecting the execution of a search for receipts via a third-party application 130. In this example, the third-party application 130 may be monitored via a corresponding service which detects when a search for receipts is executed via the third-party application 130. The service notifies the PIAR management engine 102 if and when a search for receipts is executed via the third-party application 130. The service may be implemented separately from the third-party application 130 or as a component (e.g., a plug-in) of the third-party application 130.

In an embodiment, a trigger is detected based on at least one field of a third-party application that is (a) executing independently of the detection process on the PIAR management system 100, (b) is not controlled by the detection process on the PIAR management system 100, and/or (c) is remote from the PIAR management system 100. For example, an application plugged into the PIAR management system 100 may include a monitoring system that notifies the PIAR management system 100 when an application-specific trigger such as a keyword search on email is satisfied, but the application may only allow a limited amount of customization for that application-specific trigger (such as specifying the keyword for the search), without allowing customization of other conditions (such as, in one example, whether the keyword is within X words of another keyword, or, in another example, whether information about an email (possibly a prior email) with the keyword has already been detected and stored in a table).

In addition to a triggering third-party application, one or more additional third-party applications for performing an action ("action applications") may be linked ("plugged in") to the PIAR management engine 102 via respective services. Services may be implemented separately from or as a component of the action applications. Services may use an API corresponding to the action applications to use the action applications for actions.

The third-party application may include one or more third-party application fields (e.g., 132a-132n) corresponding to required inputs. The third-party application field may include functionality to accept input from the PIAR management engine 102. The third-party application field may be exposed to the PIAR management engine 102 via an API of the third-party application. A third-party application field may be mapped to multiple user-exposed fields across multiple users.

In one or more embodiments, the third-party application 130 is not in any way affected by the execution of the PIAR management engine 102 which uses at least one of fields (e.g., third-party application fields 132a-132n) managed by the third-party application 130. The PIAR management engine 102 may execute, and/or cause execution of, a sequence of actions that provide an altogether different functionality than the functionality natively supported by the independently executing third-party application 130.

In an embodiment, the PIAR management system 100 determines that actions (e.g., 118a-118n) have been triggered when a change in the value of a third-party application field, managed by the independently executing third-party application 130, meets a threshold criteria. As an example, suppose that a third-party application field specifies a location, and search results associated with the location are to be presented in response to a query. In this example, a change in city may meet the threshold criteria. The threshold criteria specified to the PIAR management system 100 might be different than any threshold criteria supported by the built-in monitoring process of the third-party application, even though the threshold criteria may be based on variables that are accessible from the third-party application, and even though such variables may change over time. The PIAR management system 100 may execute or cause execution of actions (118a-118n) in response to detecting that the actions have been triggered.

2. Managing a Plug-in Application Recipe

Figure 2:
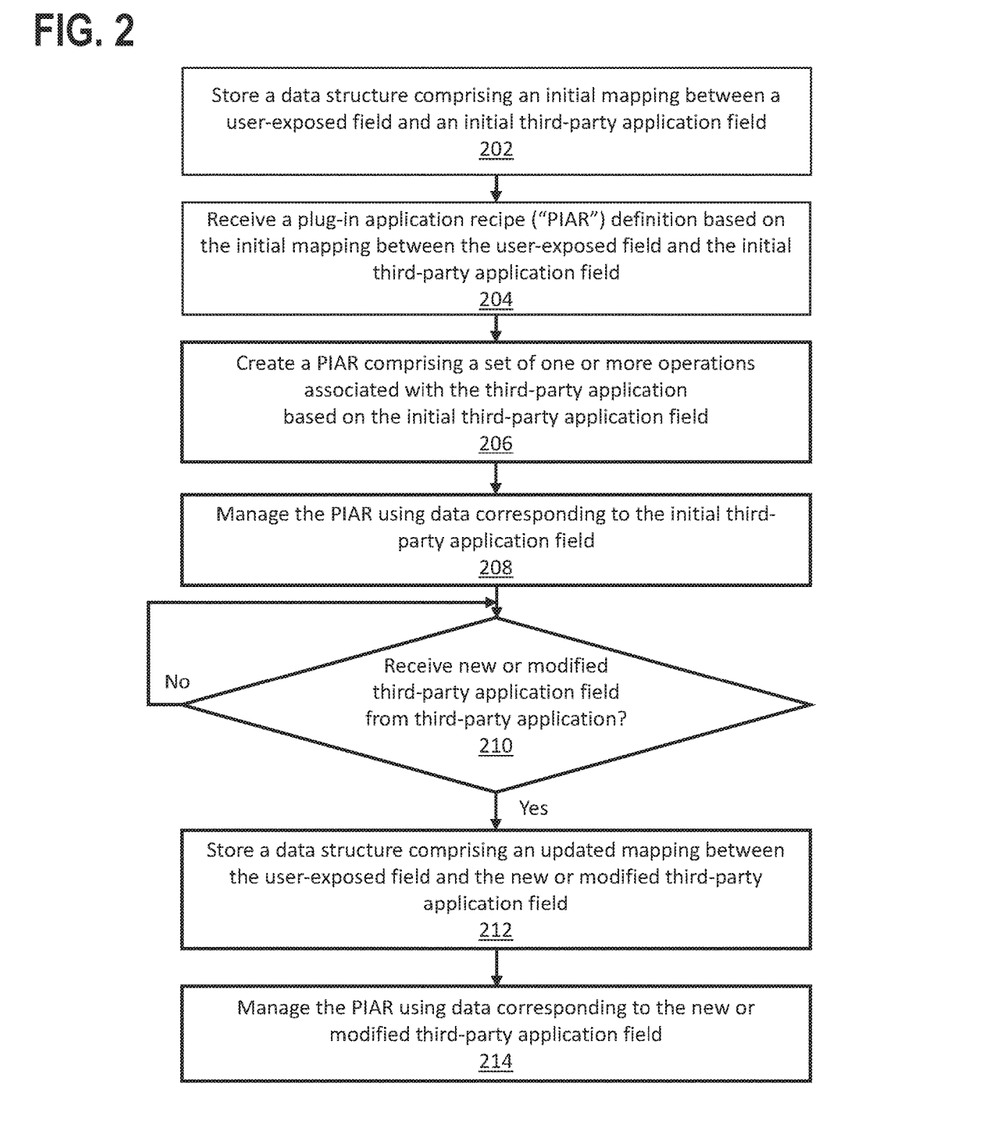
FIG. 2 illustrates an example set of operations for managing a PIAR in accordance with one or more embodiments.

FIG. 2 includes an example set of operations for managing a plug-in application recipe ("PIAR"). Other operations not described herein may be used instead and/or in addition to the described operations. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, a PIAR management system stores a data structure comprising an initial mapping between a user-exposed field and an initial third-party application field (Operation 202). The PIAR management system may store one or more mappings between a user-exposed field and a third-party application field to the data repository. The PIAR management system may generate the mappings. For example, the PIAR management system may access metadata exposed by the third-party application, and use the metadata to generate a mapping to a user-exposed field. Alternatively or additionally, an administrator may generate a mapping from a third-party application field to a user-exposed field based on third-party application documentation. A mapping may retrieve information from one application via an exposed API, and send the information to another application via a different exposed API.

In an embodiment, the PIAR management system receives a PIAR definition based on the initial mapping between the user-exposed field and the initial third-party application field (Operation 204). The PIAR management system may receive the PIAR definition via a PIAR creation interface such as a graphical user interface (GUI) associated with the PIAR management system. For example, the PIAR creation interface may obtain, from user input to a user-exposed field, a selected trigger or action defining a PIAR. The PIAR management engine may then query the data repository to find a mapping of the selected user-exposed field to the corresponding third-party application field. The mapping between the user-exposed field and a third-party application field may not be exposed to a user via the PIAR creation interface. An operation of the third-party application, such as an action or trigger, is not necessarily exposed via the PIAR creation interface, although the operation may be exposed as usable by the third-party application.

In an embodiment, the PIAR management system creates a PIAR comprising a set of one or more operations associated with the third-party application based on the initial third-party application field (Operation 206). Creating a PIAR may include specifying a triggering application, and a triggering event within that application. The PIAR may specify a series of operations to be executed in a specified order, upon detection of the triggering event. Creating a PIAR may include generating instructions to cause the execution of one or more operations in one or more third-party applications. For example, a PIAR definition may be stored as a digital object that includes JavaScript Object Notation (JSON) requests to transmit to an API of a third-party application, to request that the third-party application execute a series of operations, subject to prescribed input parameters.

In an embodiment, the PIAR management engine may monitor for triggering changes in data values over time even though such triggers are not natively supported by the third-party application. As another example, the PIAR management engine may monitor for a trigger via an aggregate data value (e.g., summed or averaged over time or over a number of consecutive data retentions or changes), or a masked data value (e.g., a data value that indicates the presence or absence of data or a change in data, even though the data itself is masked to the PIAR management system or the end user, or is altogether unavailable to the end user). As another example, the third-party application may detect a trigger, independent of the PIAR management engine.

A trigger may be determined based on (a) a standard third-party application trigger and (b) trigger customization information. Similarly, an action may be determined based on (a) a standard third-party application action and/or (b) action customization information. For example, suppose the third-party application is a photo hosting application. In this example, the photo hosting application has a standard operation, "upload photo," which is mapped directly to an "upload photo" action of the corresponding PIAR. As another example, the action may be customizable beyond what is normally available via the third-party application. In this example, the PIAR management engine, via a PIAR creation interface, may facilitate uploading a photo with tagging information, where tagging information is unavailable in the stand-alone third-party application.

As an example, an action may include metadata for a trigger of a new PIAR. The metadata may indicate one or more triggers, one or more trigger types, a number of trigger types, and/or condition metadata for determining whether or not the trigger of the new PIAR is satisfied. As another example, a first action may specify an application that is to be used to execute a second action, one or more action types available to an application, and/or content data for enriching an action. As an example, an action may specify a type of PIAR: "email welcome letter to potential client" without specifying the application (Gmail, Outlook, etc.) that is to be used for completing the action. In this example, the PIAR management engine may determine email applications available to a user of a user account associated with the action, and use any of the available email applications.

In an embodiment, the PIAR management engine may create a particular PIAR based in part on authentication credentials received by the PIAR creation interface. The authentication credentials may be associated with a particular user of a set of users with user accounts managed by the third-party application. The PIAR management engine may link to the third-party application by storing authentication credentials, e.g., as an encrypted authorization token. The PIAR management engine may poll the third-party application to obtain data corresponding to detection of triggers. Linking the third-party application to the PIAR management engine may include establishing a reusable data pipeline for transferring data from the third-party application to the PIAR management engine in a continuous, periodic, or sporadic manner.

In an embodiment, the PIAR management engine manages the PIAR using data corresponding to the initial third-party application field (Operation 208). Based on the initial mapping, the PIAR management engine may send or receive data from the initial third-party application field as provided by the third-party application via the API. The PIAR management engine may manage the PIAR in an active state.

In an embodiment, the PIAR management engine manages the PIAR by monitoring an API of the third-party application for a trigger via the initial third-party application field. The PIAR management engine periodically receives data from the initial third-party application field via the API. The PIAR management engine checks the received data against a triggering condition of the PIAR. For example, suppose the PIAR relates to maintaining a contact list, with the fields "first name" and "last name." In this example, the contact list is updated with a new name whenever a user receives an email from a new contact. The receipt of an email from a new contact is the triggering condition for a PIAR that adds a new entry to the contact list. The PIAR management engine periodically makes outbound calls to an email application (e.g., Gmail), querying whether an email has been received from a new contact. The email application repeatedly responds that no emails have been received from a new contact. Upon receiving a response, from the third-party application, that an email has been received from a new contact, the PIAR management engine initiates the execution of a sequence of action steps.

In an embodiment, the PIAR management engine manages the PIAR by managing an action of a third-party application via a third-party application field. The PIAR management engine sends data to the third-party application field via the API. The data is an instance of a triggered action of the PIAR. For example, suppose the contact list PIAR described above has been triggered after an email was received from a new contact. In this example, the PIAR management engine sends a corresponding first name and last name to corresponding fields exposed by an API of an email marketing application (e.g., Constant Contact™). The first name and last name are sent to the email marketing application as an instance of an action to add a corresponding entry to a contact list.

The PIAR management engine may receive a new or modified third-party application field from the third-party application (Operation 210). The PIAR management engine may continually, periodically, or sporadically determine whether one or more of the fields managed by a third-party application have been modified. The determination may be made based on a notification. The notification may be a periodic update indicating whether a field has been modified. The PIAR management engine may periodically receive the notification via a pull operation executed by the detection process or a push operation executed by either the PIAR management engine or another software component. Alternatively, the PIAR management engine may only receive the notification via a push operation that is executed when the values for the fields have been modified.

The third-party application field may be a new application field that is different and separate from any preexisting third-party application fields. The third-party application field may be a modification of a preexisting third-party application field. For instance, a developer of the third-party application may modify the steps in a particular operation. The third-party application may be modified so that a particular operation has an additional step required. Alternatively or additionally, the third-party application may be modified so that a particular operation requires a new or modified input. For example, suppose a third-party application can save a database of customer information. In this example, the functionality of saving information for a new customer is mapped to a PIAR of the PIAR management system called "Add Customer." Initially, for each customer, the third-party application requires the following fields: customer name, customer mailing address, and customer phone number. The third-party application is modified to additionally require a customer ID number for each customer. There is a new third-party application field, i.e., customer ID number.

Subsequent to receiving a new or modified third-party application field, the PIAR management system stores a data structure comprising an updated mapping between the user-exposed field and the new or modified third-party application field (Operation 212). A user-exposed field may be mapped to a third-party application trigger corresponding to the new or modified third-party application field. Similarly, an action corresponding to a user-exposed field may be mapped to a third-party application action corresponding to the new or modified third-party application field. For example, suppose a third-party application has been modified to include a new third-party application field, "customer ID number," corresponding to an "Add Customer" PIAR. In this example, the PIAR management system generates an updated mapping for the "Add Customer" PIAR. The PIAR management system retrieves a customer ID number based on the corresponding customer name and address. The PIAR management system adds the customer ID number to the updated mapping. Then, when the PIAR is executed, the PIAR management system sends the retrieved customer ID number to the third-party application, in addition to the customer name, customer mailing address, and customer phone number. In this case, the PIAR is updated subsequent to receiving the identification of the new or modified third-party application field without any additional user input for modifying the PIAR definition via the PIAR creation interface or other interfaces.

In an embodiment, the new or modified third-party application field is not exposed or accessible to a user via the PIAR creation interface. In other words, a new or modified third-party application field that was not previously a "user-exposed" field may continue to not be a user-exposed field. Continuing the above example, a field for customer ID number is not exposed to a user of the PIAR creation interface, even after the third-party application has been modified to include a customer ID number.

In an embodiment, the PIAR management system may modify the PIAR creation interface to require additional user input to reflect a new or modified third-party application field. For example, suppose a third-party application is modified to require a customer email address when adding a new customer to its customer database. In this example, the PIAR management engine is unable to retrieve a customer email address without additional user input. The PIAR management system modifies the PIAR creation interface to display a new user-exposed field, "email address." Upon receiving, as user input, a selection of a field corresponding to the customer email address, the PIAR management engine updates the mapping to reflect the received selection.

For a preexisting PIAR, the PIAR creation interface may transmit an alert to a user, with a notification that additional information is required.

In an embodiment, the PIAR management engine manages the PIAR using data corresponding to the new or modified third-party application field (Operation 214). Based on the updated mapping, the PIAR management engine may send or receive data from the new or modified third-party application field as provided by the third-party application via the API. The PIAR management engine may, without modifying the PIAR, manage the PIAR in an active state.

In an embodiment, the PIAR management engine monitors for a triggering condition using the updated mapping to the new or modified third-party application field. The PIAR management engine periodically receives data from the new or modified application field. The PIAR management engine checks the received data from the new or modified application field against a condition of the PIAR. For example, suppose the updated mapping is for a PIAR maintaining a contact list, as described above with respect to Operation 208. In this example, the updated mapping includes the third-party application fields "first name" and "last name" included in the initial mapping, along with the new third-party application field "middle name." The PIAR management engine periodically queries the email application API for new data in the first name, last name, and middle name fields.

In an embodiment, the PIAR management engine manages an action of the third-party application using the updated mapping to the new or modified third-party application field. The PIAR management engine sends data to the new or modified third-party application field via the API.

In an embodiment, the PIAR management engine updates from the initial mapping to the updated mapping at some predetermined time. The time at which the updated mapping is activated may correspond to a time at which developers of the third-party application have scheduled a change to the third-party application, such that a new or modified third-party application field replaces the initial third-party application field. A third-party application provider may notify users of a planned modification to an API. With notification of a planned modification, the PIAR management system may set the activation time, based on the notification. The PIAR management system may be notified of a change to a field, and analyze the syntax of the fields to determine the implication of the change on the mapping. For example, the PIAR management system may determine that a middle name field was mandatory and part of a unique key in the initial mapping. In the updated mapping, based on semantic analysis of the fields, the PIAR management system determines that the middle name field is no longer required.

The PIAR management system may implement the updated mapping at the same time that the third-party application API changes. The PIAR may remain in the active state, using the initial mapping, before the time that the third-party application API changes. The PIAR may remain in the active state, using the updated mapping, after the third-party application API changes. The PIAR may remain in the active state, without deactivating the PIAR, as the PIAR management system activates and deactivates mappings. PIARs may remain active and functional during the API change of the third-party application.

Alternatively, the PIAR management system may implement the updated mapping after the API change of the third-party application. The PIAR management system may not be notified about a planned API change. The PIAR management system instead detects an API change after the API is modified, via a notification, automated discovery process, or some other mechanism. For example, a PIAR may cease to function properly upon a change to an API of a third-party application. The PIAR management system may locate PIARs that have failed in between the implementation of the updated mapping and the API change of the third-party application. The PIAR management system may reactivate any located failed PIARs after applying the updated mapping, so that the PIARs may be used with the updated mapping.

In an embodiment, the PIAR management system does not update mappings in response to each and every change in third-party applications. For example, a third-party application may be updated to introduce a new API endpoint, while leaving existing API endpoints in place. Thus, a third-party application's addition of a new API endpoint may be "backward-compatible" in the sense that it does not break existing functionality, including mappings used by PIARs. The PIAR management system may ignore some or all third-party application changes that are backward-compatible. In contrast, the removal of an endpoint that is used in a mapping may not be backwards-compatible; the removal of the API endpoint may effectively break (i.e., render functionally inoperable) a PIAR that depends on that mapping. Thus, the PIAR management application may not be able to ignore a third-party application change that involves the removal of an API endpoint. In an embodiment, even if a new API endpoint is backward-compatible, the older API endpoint may be considered deprecated. The older API endpoint may be marked for removal at some time in the future. The PIAR management system may update mappings to use the new API endpoint and begin using the updated mappings when the older API endpoint is removed.

Figure 3A:
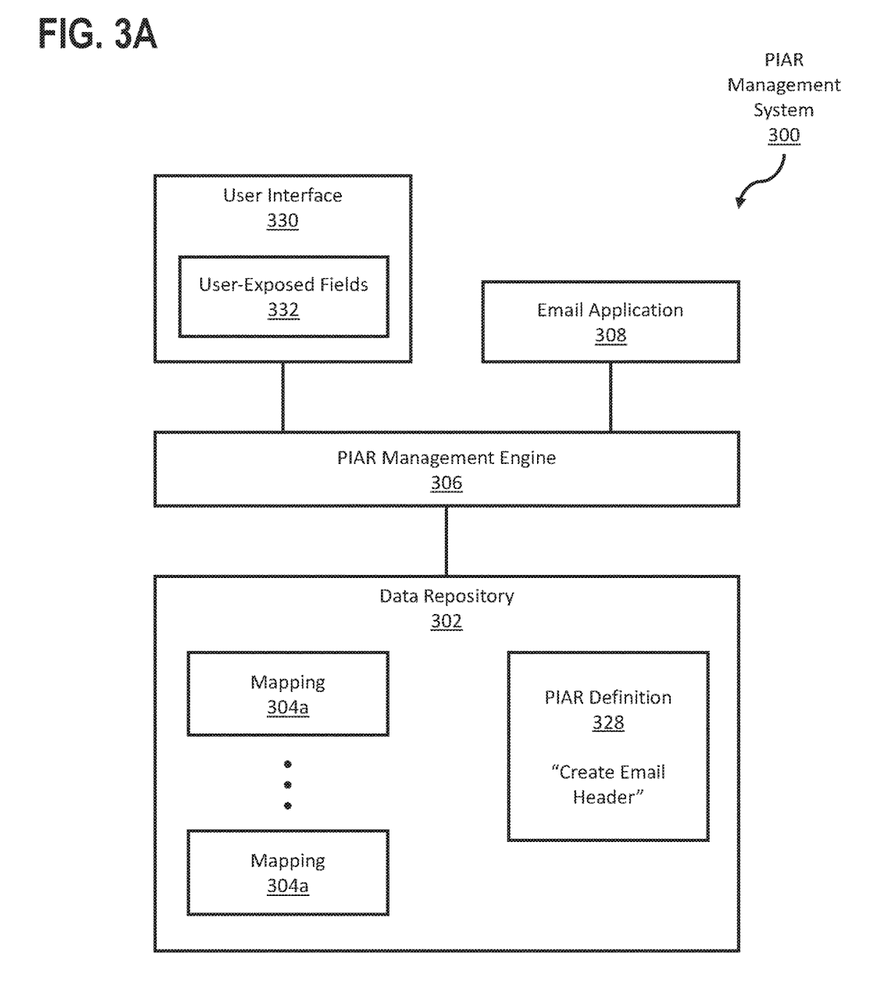
FIGS. 3A-3B illustrate block diagrams of an example in accordance with one or more embodiments.
Figure 3B:
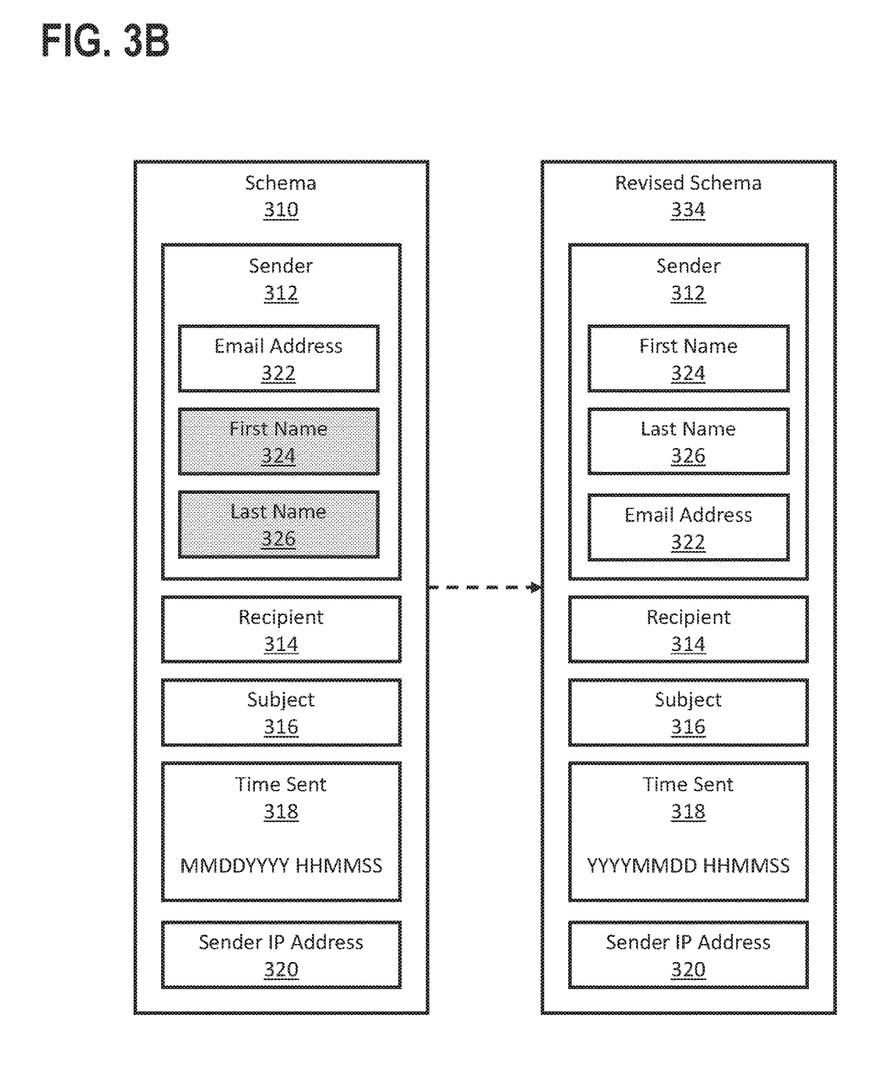

FIGS. 3A-3B illustrate block diagrams of an example in accordance with one or more embodiments. The example shown in FIGS. 3A-3B is provided for illustrative purposes only and should not be construed as limiting one or more embodiments.

As illustrated in FIG. 3A, a PIAR management system 300 stores, as metadata in a data repository 302, mappings 304a-304n between user-exposed fields and respective third-party application fields, including fields associated with an email application 308. The metadata includes the data and endpoints required for the PIAR management engine 306 to transmit a request to an API of the email application. The metadata further includes mapping information, linking a series of user-exposed fields to the appropriate third-party application fields.

As illustrated in FIG. 3B, the email application 308 uses a specific schema 310 to accept input. The schema for the email application includes several fields that require the email application 308 to receive information in a specific format and order. For example, the email application 308 may create an email header. In this example, the email application must receive an array with a sender 312, recipient 314, subject 316, time sent 318, and sender IP address 320. The sender element must include an email address 322 and, optionally (as indicated in the illustration by gray backgrounds), a first name 324 and last name 326. The time sent 318 must be in the format MMDDYYYY HHMMSS. The PIAR management system 300 creates a PIAR named "Create Email Header," stored in the data repository 302 as a PIAR definition 328. The PIAR is triggered when an email draft has been saved without a header. Based on the email application fields, the PIAR management system 300 displays user-exposed fields 332 in a user interface 330. The user-exposed fields 332 are curated to be user-friendly. For example, because a user's IP address typically is available without user input and a user may be confused by a request for her IP address, the user-exposed fields 332 presented to a user do not include the user's IP address.

Similarly, it is preferable for the user to not be asked for a specific time in a specific format. Instead, the PIAR management system 300 may acquire a time sent, and add the time sent to the email header, in the appropriate format, according to the PIAR definition 328 without the need for user input. For example, the user interface 330 may expose the following user-exposed fields to the user:

Sender Email Address: [text entry field]
(Optional) Sender Name (First, Last): [text entry field] [text entry field]
Recipient Email Address: [text entry field]
Subject: [text entry field]

Upon receiving the required user input, the PIAR management system 300 concatenates the fields into an array along with the additional information (e.g., sender IP address and time sent) required by the email application 308. The PIAR management system transmits the array to the email application 308. The email application 308 generates an email header and returns the email header to the PIAR management system 300, based on the information in the array.

The user interface 330 may additionally allow a user to customize certain actions. For example, although the email application 308 does not include an "importance" flag in the email header, the user interface 330 may include a user-exposed field labeled, for example, "Importance." In this example, the "Importance" user-exposed field displays a drop-down menu, with the options: extremely urgent, urgent, and normal. The PIAR management system 300 receives the input "Urgent" from a user interaction with the "Importance" drop-down menu. The PIAR management system 300 adds "Urgent" to the subject field of the email header input array before transmitting the email header input array to the email application 308. Resultantly, the tag "Urgent" is displayed in the generated email header.

Continuing with the "Create Email Header" example above, the PIAR management system 300 manages the PIAR, stored as the PIAR definition 328, using data corresponding to the email application fields. The PIAR management system 300 periodically queries the email application to determine whether an email draft has been saved without a header. If and when the PIAR management system 300 receives a response indicating that an email draft has been saved without a header, the PIAR management system 300 initiates a series of actions for creating an email header.

The PIAR management system 300 sends data to be stored as email application fields, as instances of triggered actions of the PIAR definition 328. Upon receiving, from user input, data corresponding to a sender email address, recipient email address, and subject, the PIAR management system 300 sends the data to corresponding fields exposed by the API of the email application 308. The email application 308 creates an email header with the received data.

Still continuing with the example, the email application 308 may change its requirements, in a manner that calls for a modification of the corresponding mapping used in the PIAR definition 328. Subsequent to the creation of the PIAR definition 328 used to generate the above-described email header, the email application modifies its requirements. As illustrated in FIG. 3B, the email application 308 now uses a revised schema 334, in which the sender field must include a first name 324, last name 326, and email address 322. The first name 324 and last name 326 fields no longer are optional. As another example, the revised schema 334 may now require the time sent 318 in the format YYYYMMDD HHMMSS. The PIAR management system 300 stores an updated mapping, reflecting the modified revised schema 334 used for the email application fields. The PIAR management system 300 has stored a name associated with each user email address to the data repository 302. The PIAR management system 300 can adjust the email address field to suit the modified requirements of the third-party application. No further user interaction is required to update the PIAR definition 328 to create an email header.

As discussed above, a mapping may be updated without interrupting the operation of a PIAR. Continuing with the example, the email application 308 may issue a notification that it will update its API (i.e., start using the revised schema 334 instead of the prior schema 310) at 5:00 p.m. At 4:59 p.m., the PIAR management system 300 replaces the initial mapping with the modified mapping. The PIAR remains active as the PIAR management system 300 updates the mapping.

When the time switches from 4:59 p.m., to 5:00 p.m. the PIAR management system 300 switches the mapping it is using, and begins managing the PIAR using the updated mapping, i.e., the mapping to the modified email application field according to the revised schema 334. At this point, the PIAR management system 330 transmits data to be stored to the modified email application field as an instance of a triggered action of the PIAR. Upon receiving, from user input, data corresponding to a sender email address, recipient email address, and subject, the PIAR management system looks up the sender's first name and last name in the data repository 302, and sends the data to corresponding fields exposed by the API of the email application 308, with the sender field in the format "First Name", "Last Name," "Email Address."

3. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
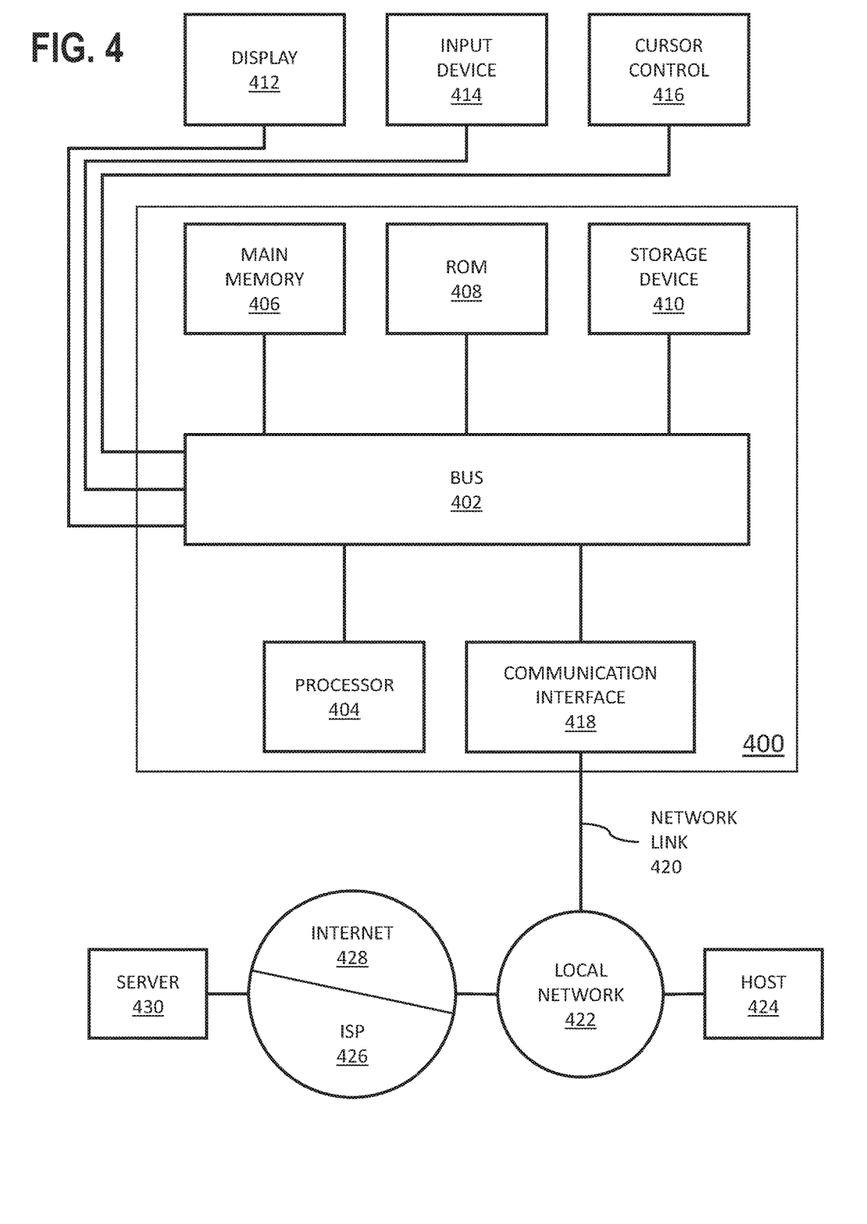
FIG. 4 illustrates a block diagram of a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to execute the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 410. Volatile media include dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   storing a first mapping between:
      a set of user-exposed fields selectable via a plug-in application recipe ("PIAR") creation interface associated with a PIAR management engine, and
      another set of fields exposed by an Application Programming Interface (API) of a third-party application,
   wherein the PIAR management engine manages PIAR definitions, each PIAR definition identifying
      (a) a trigger for which one or more trigger variables, values of which are necessary to evaluate the trigger on an ongoing basis, are exposed by a first plug-in application to the PIAR management engine, wherein an instance of evaluating the trigger comprises determining whether a condition is satisfied based at least in part on one or more values of the one or more trigger variables, and
      (b) an action for which a second plug-in application exposes an interface to the PIAR management engine for causing the second plug-in application to carry out the action, wherein an instance of evaluating the action comprises carrying out the action based on one or more values of one or more input variables that are input to the action in the PIAR definition,
   wherein the PIAR management engine makes the action conditional on the trigger on an ongoing basis, and
   wherein the PIAR definition comprises a particular trigger and a particular action;
   receiving, via one or more PIAR creation interfaces, a plurality of PAIR definitions based at least on a user-selected field of the set of user-exposed fields;
   wherein the user-selected field is mapped, in the first mapping, to a first third-party application field exposed by the API of the third-party application, wherein the first third-party application field is associated with the particular trigger or the particular action;
   managing a particular PIAR in an active state, wherein the particular PIAR corresponds to a PIAR definition of the plurality of PIAR definitions, and wherein managing the particular PIAR comprises periodically receiving and checking, against a condition of the particular PIAR, data from the first third-party application field as provided by the third-party application via the API;

during or after managing the particular PIAR in the active state, storing information comprising an update from the first mapping to a second mapping, wherein the second mapping maps the user-selected field to a second third-party application field, wherein the second third-party application field differs from the first third-party application field;

without modifying the particular PIAR, managing the particular PIAR in the active state at least in part by periodically receiving and checking, against the condition of the particular PIAR, data from the second third-party application field as provided by the third-party application via the API.

2. The one or more media of claim 1, further storing instructions which, when executed by one or more processors, cause:

at an activation time, activating the second mapping and deactivating the first mapping, wherein the particular PIAR remains in the active state using the first mapping before the activation time and the second mapping after the activation time, without deactivating the particular PIAR.

3. The one or more media of claim 1, wherein the second third-party application field is a new application field that is different and separate from the first third-party application field.

4. The one or more media of claim 1, wherein the second third-party application field is a modification of the first third-party application field.

5. The one or more media of claim 1, wherein the second mapping is not exposed to a user via the PIAR creation interface.

6. The one or more media of claim 1, wherein the condition of the particular PIAR is determined based on (a) a standard third-party application condition and (b) condition customization information.

7. The one or more media of claim 1, wherein the second third-party application field is not exposed or accessible to a user via the PIAR creation interface.

8. One or more non-transitory machine-readable media storing instructions which, when executed by one or more processors, cause:

storing a first mapping between:
a set of user-exposed fields selectable via a plug-in application recipe ("PIAR") creation interface associated with a PIAR management engine, and
another set of fields exposed by an Application Programming Interface (API) of a third-party application, wherein the PIAR management engine manages PIAR definitions, each PIAR definition identifying
(a) a trigger for which one or more trigger variables, values of which are necessary to evaluate the trigger on an ongoing basis, are exposed by a first plug-in application to the PIAR management engine, wherein an instance of evaluating the trigger comprises determining whether a condition is satisfied based at least in part on one or more values of the one or more trigger variables, and
(b) an action for which a second plug-in application exposes an interface to the PIAR management engine for causing the second plug-in application to carry out the action, wherein an instance of evaluating the action comprises carrying out the action based on one or more values of one or more input variables that are input to the action in the PIAR definition, wherein the PIAR management engine makes the action conditional on the trigger on an ongoing basis, and wherein the PIAR definition comprises a particular trigger and a particular action;

receiving, via one or more PIAR creation interfaces, a plurality of PIAR definitions based at least on a user-selected field of the set of user-exposed fields;

wherein the user-selected field is mapped, in the first mapping, to a first third-party application field exposed by the API of the third-party application, wherein the first third-party application field is associated with the particular trigger or the particular action;

managing a particular PIAR in an active state, wherein the particular PIAR corresponds to a PIAR definition of the plurality of PIAR definitions, and wherein managing the particular PIAR comprises sending, as an instance of a triggered action of the particular PIAR, data to be stored to the first third-party application field via the API;

during or after managing the particular PIAR in the active state, storing information comprising an update from the first mapping to a second mapping, wherein the second mapping maps the user-selected field to a second third-party application field, wherein the second third-party application field differs from the first third-party application field;

without modifying the particular PIAR, managing the particular PIAR in the active state at least in part by sending, as another instance of the triggered action of the particular PIAR, data to be stored to the second third-party application field via the API.

9. The one or more media of claim 8, further storing instructions which, when executed by one or more processors, cause:

at an activation time, activating the second mapping and deactivating the first mapping, wherein the particular PIAR remains in the active state using the first mapping before the activation time and the second mapping after the activation time, without deactivating the particular PIAR.

10. The one or more media of claim 8, wherein the second third-party application field is a new application field that is different and separate from the first third-party application field.

11. The one or more media of claim 8, wherein the second third-party application field is a modification of the first third-party application field.

12. The one or more media of claim 8, wherein the triggered action is determined based on (a) a standard third-party application action and (b) action customization information.

13. The one or more media of claim 8, wherein the second mapping is not exposed to a user via the PIAR creation interface.

14. The one or more media of claim 8, wherein the second third-party application field is not exposed or accessible to a user via the PIAR creation interface.

15. A method comprising:
storing a first mapping between:
a set of user-exposed fields selectable via a plug-in application recipe ("PIAR") creation interface associated with a PIAR management engine, and another set of fields exposed by an Application Programming Interface (API) of a third-party application, wherein the PIAR management engine manages PIAR definitions, each PIAR definition identifying (a) a trigger for which one or more trigger variables, values of which are necessary to evaluate the trigger on an ongoing basis, are exposed by a first plug-in application to the PIAR management engine, wherein an instance of evaluating the trigger comprises determining whether a condition is satisfied based at least in part on one or more values of the one or more trigger variables, and (b) an action for which a second plug-in application exposes an interface to the PIAR management engine for causing the second plug-in application to carry out the action, wherein an instance of evaluating the action comprises carrying out the action based on one or more values of one or more input variables that are input to the action in the PIAR definition, wherein the PIAR management engine makes the action conditional on the trigger on an ongoing basis, and wherein the PIAR definition comprises a particular trigger and a particular action;

receiving, via one or more PIAR creation interfaces, a plurality of PIAR definitions based at least on a user-selected field of the set of user-exposed fields;

wherein the user-selected field is mapped, in the first mapping, to a first third-party application field exposed by the API of the third-party application, wherein the first third-party application field is associated with the particular trigger or the particular action;

managing a particular PIAR in an active state, wherein the particular PIAR corresponds to a PIAR definition of the plurality of PIAR definitions, and wherein managing the particular PIAR comprises periodically receiving and checking, against a condition of the particular PIAR, data from the first third-party application field as provided by the third-party application via the API;

during or after managing the particular PIAR in the active state, storing information comprising an update from the first mapping to a second mapping, wherein the second mapping maps the user-selected field to a second third-party application field, wherein the second third-party application field differs from the first third-party application field;

without modifying the particular PIAR, managing the particular PIAR in the active state at least in part by periodically receiving and checking, against the condition of the particular PIAR, data from the second third-party application field as provided by the third-party application via the API;

wherein the method is performed by at least one device including a hardware processor.

16. The method of claim 15, further comprising, at an activation time, activating the second mapping and deactivating the first mapping, wherein the particular PIAR remains in the active state using the first mapping before the activation time and the second mapping after the activation time, without deactivating the particular PIAR.

17. The method of claim 15, wherein the second third-party application field is a new application field that is different and separate from the first third-party application field.

18. The method of claim 15, wherein the second third-party application field is a modification of the first third-party application field.

19. The method of claim 15, wherein the second mapping is not exposed to a user via the PIAR creation interface.

20. The method of claim 15, wherein the condition of the particular PIAR is determined based on (a) a standard third-party application condition and (b) condition customization information.

* * * * *

UNITED STATES PATENT AND TRADEMARK OFFICE
CERTIFICATE OF CORRECTION

PATENT NO. : 10,394,629 B2
APPLICATION NO. : 15/994346
DATED : August 27, 2019
INVENTOR(S) : Chang et al.

Page 1 of 1

It is certified that error appears in the above-identified patent and that said Letters Patent is hereby corrected as shown below:

In the Specification

In Column 5, Line 23, delete "PAIR" and insert -- PIAR --, therefor.

In Column 6, Line 25, delete "PAIR" and insert -- PIAR --, therefor.

In Column 6, Line 30, delete "PAIR" and insert -- PIAR --, therefor.

In Column 7, Line 1, delete "PAIR" and insert -- PIAR --, therefor.

In Column 7, Line 37, delete "PAIR" and insert -- PIAR --, therefor.

In Column 8, Line 37, delete "PAIR" and insert -- PIAR --, therefor.

In the Claims

In Column 20, Line 56, in Claim 1, delete "PAIR" and insert -- PIAR --, therefor.

Signed and Sealed this
Twenty-fifth Day of August, 2020

Andrei Iancu
*Director of the United States Patent and Trademark Office*